(12) United States Patent
Smith et al.

(10) Patent No.: US 6,233,685 B1
(45) Date of Patent: May 15, 2001

(54) ESTABLISHING AND EMPLOYING THE PROVABLE UNTAMPERED STATE OF A DEVICE

(76) Inventors: Sean William Smith, 40 Firth St., Cornwall, NY (US) 12518; Steve Harris Weingart, 1399 SW. 1st St., Boca Raton, FL (US) 33486

( * ) Notice: Subject to any disclaimer, the term of this patent is extended or adjusted under 35 U.S.C. 154(b) by 0 days.

(21) Appl. No.: 08/920,815

(22) Filed: Aug. 29, 1997

(51) Int. Cl.[7] .......................... G06F 11/30; H04K 11/00
(52) U.S. Cl. ..................... 713/194; 713/193; 713/185
(58) Field of Search .................. 380/24, 25, 52; 713/135, 156, 152, 175, 193, 194, 185

(56) References Cited

U.S. PATENT DOCUMENTS

| | | |
|---|---|---|
| 4,218,582 | 8/1980 | Hellman et al. . |
| 4,860,351 | 8/1989 | Weingart . |
| 5,159,629 | 10/1992 | Double et al. . |
| 5,233,505 * | 8/1993 | Chang et al. ................. 361/7.85 |
| 5,557,518 | 9/1996 | Rosen ................................ 705/69 |
| 5,689,243 * | 11/1997 | Bianco ........................... 340/825.3 |
| 5,774,552 * | 6/1998 | Grimmer ............................ 380/25 |
| 5,781,723 * | 7/1998 | Yee et al. ......................... 395/186 |
| 5,799,085 * | 8/1998 | Shona ................................ 380/23 |
| 5,805,712 * | 9/1998 | Davis ................................ 380/50 |
| 6,088,797 | 7/2000 | Rosen ............................... 713/173 |

OTHER PUBLICATIONS

Menezes et al., Handbook of Applied Cryptography, CRC Press, Oct. 17, 1996, pp. 572–578.*

Federal Information Processing Standards Publication, Security Requirements For Cryptogra. Modules, US Dept. of Commerce, Jan. 11, 1994, FIPS PUB 140–1, p. 1–56.

* cited by examiner

*Primary Examiner*—Gail Hayes
*Assistant Examiner*—Bryan Latham
(74) *Attorney, Agent, or Firm*—Louis P. Herzberg (57) ABSTRACT

A method and apparatus is presented for establishing provable integrity or untampered state in secure devices. It employs active tamper response; generating authentication secrets inside the device via real hardware randomness to minimize risk of compromised factory machines; activating tamper response at a trusted point of trust to protect against attacks and/or continually certify the integrity of the device along shipping channels and at user sites; and allowing for all keys to be regenerated so that in accordance with sound cryptographic practice no one needs to depend on permanent keys. The point of trust is a central authority that is trusted by all parties that need to trust the provable untampered state of the secure device. At any point the certifying authority authenticates the integrity and/or untampered state of the device, and re-issues a new certificate for that device. Alternate embodiments enable the device to be shipped without its tamper-response enabled, and/or to re-initialize and certify devices that have been erased or zeroized. Particular methods are used to restrict access of the device's central private key only to trustworthy code in the device. This invention minimizes the parties that one must trust in order to trust in the alleged integrity and/or untampered state of a device, while providing disaster protection with simplicity of device shipping, use and installation.

34 Claims, 7 Drawing Sheets

Fig. 1(a)

*Manufacturer:*

```
┌──────────────┐
│ Enable       │
│ Tamper Response │
│ (102)        │
└──────┬───────┘
```

*Device:*

```
       ┌──────────────┐
       │ Generate Keypair │
       │ (104)        │
       └──────┬───────┘
              ▼
       ┌──────────────┐
       │ Store Private Key │
       │ in Secure Memory │
       │ (106)        │
       └──────┬───────┘
              ▼
       ┌──────────────┐
       │ Export Public Key │
       │ (108)        │
       └──────┬───────┘
```

*Certifying Authority:*

```
┌──────────────────┐
│ Verify Public Key │
│ came from        │
│ Untampered Device │
│ (110)            │
└────────┬─────────┘
         ▼
┌──────────────────┐
│ Verify Device Knows │
│ Private Key      │
│ (112)            │
└────────┬─────────┘
         ▼
┌──────────────────┐
│ Compose Device   │
│ Certificate      │
│ (114)            │
└────────┬─────────┘
         ▼
┌──────────────────┐
│ Sign with CA     │
│ Private Key      │
│ (116)            │
└────────┬─────────┘
         ▼
┌──────────────────┐
│ Return Certificate │
│ to Device        │
│ (118)            │
└────────┬─────────┘
         ▼
       ┌──────────────────┐
       │ Verify Certificate │
       │ came from Authority │
       │ (120)            │
       └────────┬─────────┘
                ▼
       ┌──────────────────┐
       │ Store Certificate │
       │ (122)            │
       └──────────────────┘
```

ESTABLISHING AND EMPLOYING THE PROVABLE UNTAMPERED STATE OF A DEVICE

CROSS REFERENCES

The present application is related to the following applications even dated herewith:, entitled, "Securely Downloading and Executing Code From Mutually Suspicious Authorities", by inventors S. W. Smith et al., assigned Ser. No. 08/920,814 with a filing date of Aug. 29, 1997; entitled, "Hardware Access Control Locking", by inventors T. A. Cafino et al.; and, entitled, "Authentication for Secure Devices With Limited Cryptography", by inventors M. S. Matyas et al., assigned Ser. No. 08/921,442 with a filing date of Aug. 29, 1997, which are incorporated herein by reference.

FIELD OF THE INVENTION

The present invention is directed to the field of security. It is more specifically directed to the security of data in a device.

BACKGROUND OF THE INVENTION

Scientists continue to strive to find ways to monitor and/or maintain the security level of a process, processor, coprocessor or processing element. It is recognized that heretofore, a computational device was considered to be secure if it was armored with physical packaging to prevent any access to the internal data and circuits, except via the official interface. The technology and effectiveness of this physical armor varies considerably. All secure devices, by definition, purport to have passive tamper-resistance. Some use more advanced techniques in order to also attempt to be tamper-responsive. A device is said to be tamper-responsive if it provided with a means for actively detecting tamper or penetration, and has the capability of responding by zeroizing and/or erasing sensitive data it contains before it can be observed. An example of a low-end secure device is a simple smart card. The smart card offers limited computational ability and limited, passive physical security. An example of a high-end secure device is a cryptographic server adapter, with active tamper response.

Generally, applications that require secure devices depend on the physical security of these devices. If they did not, the additional expense of physical security is usually not justifiable. Physical security is necessary if someone potentially with direct access to the device might be motivated to attack it. Such potential adversaries includes anyone with physical access. This includes personnel at the factory, along the shipping channel, at retailers and warehouses, and the often overlooked user site.

For example, consider a simple electronic wallet. In this situation, cash is simply a value in a register in the coprocessor resident in the electronic wallet. If a user manages to run their wallet program on hardware which is susceptible to tamper by that user, then that user has effectively created a bottomless wallet. This compromises the security of the entire distributed application.

A bona fide, untampered secure device needs a method by which it can prove that it is untampered and in a state of continued integrity, this is herein referred to as an untampered state method. This has some primary constraints and/or requirements. To begin with, this method needs to be computational, not physical. It is realized that a tampered device might look just like an untampered one. With current commercially viable physical security technology, physical inspection of a device does not suffice to determine if the device has been tampered with by an attacker with at least moderate skills. Without such an untampered state method, a tampered device can appear to carry out its application identically to an untampered one.

As used herein the term device includes a processor, a coprocessor, processing element and/or computational apparatus. The terms erase and/or zeroize as used herein represent any means of disabling the readabilty and/or retrieval of the secrets contained in the device. The terms integrity and untampered state are used interchangeably herein.

An useful untampered state assuredness method, or untampered state method, should employ a technology that provides physical security that also shields a device's internal data, programs, and circuits from any direct examination by the user. Otherwise, an adversary who is able to tamper with a device that performs cryptographic functions, can modify the key generation algorithms. The so tampered device appears to work normally, while the adversary learns and makes use of each key.

In many applications, the program running on such an untamperable device needs to computationally build on this provable untampered state. For example, the electronic wallet program cited above needs not just to run on an untampered device, but also to be able to convince remote agents that it is indeed running on such a device. Thus, untampered state assuredness method must enable an untampered authentic device to distinguish itself from a device that has been modified (say, to install a backdoor or to disable tamper response); and to distinguish itself from a software/hardware clone that may have been constructed after destructive analysis of several real devices.

Some chip-card techniques used heretofore employ the idea of installing a permanent key pair in a device that is merely tamper-resistant. However, these techniques do not address the problem of providing the provable untampered state to third parties in potentially hostile user environments and in an application-available way. Furthermore, tamper-responsive hardware standards do not adequately address this problem.

SUMMARY OF THE INVENTION

The present invention provides a method and apparatus to fully address the suite of problems related to provable untampered state assuredness in secure devices. It includes using active tamper response, generating authentication secrets inside the device via real hardware randomness to minimize risk of compromised factory machines, activating tamper response at a point of trust (certifying authority) to protect against attacks, and/or continually certifying the untampered state of the device along shipping channels and at user sites, and/or allowing for all keys to be regenerated so that in accordance with sound cryptographic practice there is no need to depend on permanent keys.

One aspect of the present invention provides a device having a certifying authority trusted by a user family which includes the device. The certifying authority (often the device manufacturer) has an authority private key. The device comprises a memory and a tamper circuit responsive to a tampering phenomenon and capable of being enabled by the certifying authority to respond to a tamper condition. A key pair generator 103 generates a key pair for the device. The key pair includes a device private key and a device public key. The key pair generator 103 is capable of exporting the device public key to the certifying authority such that the certifying authority performs a verification that the device public key emerged from the device, and signs a first certificate with the authority private key. The first certificate includes the device public key and at least one identifying property of the device. The authority issues the first certificate which becomes available to a third party for use in establishing that the device is in an untampered state. In an embodiment, the device further comprises a zeroizing circuit capable of erasing a portion of the memory upon the tamper circuit detecting an occurrence of the tampering phenomenon, and/or the memory includes all non-volatile memory in the device, and/or the key pair is generated using an internal source of non-deterministic randomness.

Another aspect of the invention, is a device having a memory which includes data required to be erased upon a tampering attempt. The device includes a tamper responsive circuit having an enabling capability, a certifying authority, an initialization circuit wherein the certifying authority enables the tamper responsive circuit using the enabling capability, a first key pair generator for generating a public key made available to a plurality of third party users and for generating a private key retained in the memory, a certification circuit for exporting the public key to the certifying authority via the ordinary outgoing communication channel This is such as to enable the certifying authority to verify the public key, certify that the public key emerged from the device, and certify that the device is untampered. In some embodiments, the device further includes a key pair regenerator for forming a new key pair upon an occurrence of a predetermined event, and/or a recertifier for exporting the new public key to the certifying authority such as to enable the certifying authority to verify the new public key and certify that the new public key emerged from the device and that the device is untampered, and/or a re-initialization circuit for reinitializing the device to an operative state following the device being zeroized in response to the tampering event, and/or a memory disaster protection circuit for stopping an attacker from impersonating the device.

A critical aspect here is that the certifier know which device the new public key came from. That is, that it came from the device which had previously been certified to have some other public key. Also, if the device regenerates its keypair, then the device itself will produce a "Transition Certificate", signed with the device's old private key, attesting to the change to the new public key. Such "internal recertification" can occur arbitrarily many times (limited only by policy) before external recertification occurs.

Still another aspect of the present invention is a method for a certifying authority to certify an untampered state and/or untampered state assuredness of a device. The method comprises enabling a tamper-responsive circuit in the device, generating a device first key pair including a first public key that matches a first private key, storing the first private key in the device. It also may include the steps of exporting the first public key to at least one third party, verifying that the first public key originates from the device and that the device is in the untampered state, verifying that the device knows the first private key that matches the first public key and the device is untampered, and forming a device certificate which certifies the verification of the device.

In some embodiments, the method further comprises the step of ensuring that the device certificate is available to a user to whom the device wishes to be authenticated, and/or the step of the device authenticating that the certificate came from the certifying authority. This is sometimes followed with a third party verifying the untampered state of the device. The third party uses standard cryptology protocols to verify that the device knows the private key matching a particular public key. This is done by obtaining from the device its latest external certificate (first certificate, or its replacement) and any subsequent transition certificates, by verifying the correct signing and formation of these certificates, and by verifying that these certificates attest to the public key the device allegedly owned. Also, using standard cryptographic techniques, the process of successful verification of untamperedness is then useable to prove that a particular message came from that device.

In some embodiments, the device has at least two kinds of certificates. These are the first certificate (or its replacement) signed by the external authority, and a chain of zero or more transition certificates attesting to regenerations since the last external recertification. Thus at a minimum, these are available the last externally generated certificate, and all subsequent transition certificates.

Another aspect of the present invention is the process of generating a keypair within a device, exporting the public key, and shipping the device with tamper protection enabled.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

The present invention provides a method and apparatus to fully address the suite of problems related to the provable untampered state of secure devices. The invention includes the steps and apparatus for:

using active tamper response;

generating authentication secrets inside the device via real hardware randomness to minimize risk of compromised factory machines;

activating tamper response at a trusted point of trust to protect against attacks and/or continually certify the untampered state assuredness of the device along shipping channels and at user sites; and allowing for all keys to be regenerated, so that in accordance with sound cryptographic practice no one needs to depend on permanent keys.

The particular usage of the point of trust is an important aspect of this invention. The point of trust becomes a certifying authority and will herein be called the certifying authority. It is noted that in some applications more than one certifying authority may exist. Moreover, the certifying authority may, or is even likely to change from time to time during the life of the device and/or the application. In reality the certifying authority is likely to be one or more human beings, a business entity or part thereof, and/or a computer or combinations of these.

In one embodiment the invention is implemented using the following approach. A 'certifying authority' is identified. The 'certifying authority' is a central authority that is trusted by all parties that need to trust the provable untampered state assuredness of a secure device. Identifying and having this authority be the manufacturer of the device offers several natural advantages. Firstly, since the manufacturer bears responsibility for the untampered state of the circuitry and permanent firmware in the device, all parties need to trust the manufacturer anyway. Secondly, the certifying authority must be one that possesses both the motivation and the ability to determine whether a device (without provable untampered state assuredness) is indeed genuine and untampered. The manufacturer, having just built the device, is in the best position to assert this.

Once the 'certifying authority' has been identified the device goes through the steps of 'initialization', 'keypair generation', 'certification', 'shipment and use'. Some devices also go through the steps of 'regeneration' and/or 'recertification'. Initialization is performed in the presence of the certifying authority, whereupon the device has its tamper-response circuitry enabled. From this point onward, the device zeroizes its secrets upon tamper.

Generally, keypair generation follows initialization, whereupon the device generates, or requests, a truly random key pair. This may employ RSA, DSS or any other public-key or authentication algorithms. The keypair includes a private key and a public key. The device retains the so generated private key within secure memory. Often, the keypair is generated using an internal source of real, non-deterministic randomness. This is followed by certification, wherein the device then exports its public key to the certifying authority, in a way such that the authority can verify that the public key did indeed emerge from the alleged device. A simple way to do this is in a clean room at the manufacturing facility.

The certifying authority assembles a certificate containing the device's public key, and any desired relevant identifying information about the device and its properties. The authority signs this certificate with its own private key, then returns it to the device. The device is ready for shipment and use. From this point onward, the device has the ability to prove that it is untampered by demonstrating that it knows the private key matching the public key contained in the certificate.

This is usually accomplished by using public key signatures.

In some embodiments the device is able to perform key regeneration. In this situation, the device can cause itself to generate a new key pair. This is performed in accordance with, and determined by policy. Regeneration uses its old private key to sign a transition certificate asserting the change from the old public key to a new public key. It then erases the old private key. The device retains the newly generated private key within its secure memory.

A chain of transition certificates, rooted in a certifying authority certificate, then suffices to establish the public key of the untampered card. This may be followed by recertification, wherein the device then exports its new public key to the certifying authority, in a way such that the authority can verify that the key did indeed emerge from the alleged device. At any point (again, determined by policy), the certifying authority uses the steps of this invention to authenticate an untampered device, and to re-issue a new certificate for that device, attesting to the latest public key at that device. With the appropriate choice of policy which determines what constitutes a valid key pair, both regeneration and recertification can ensure that no one needs to depend on a permanent key pair.

Figure 1A:
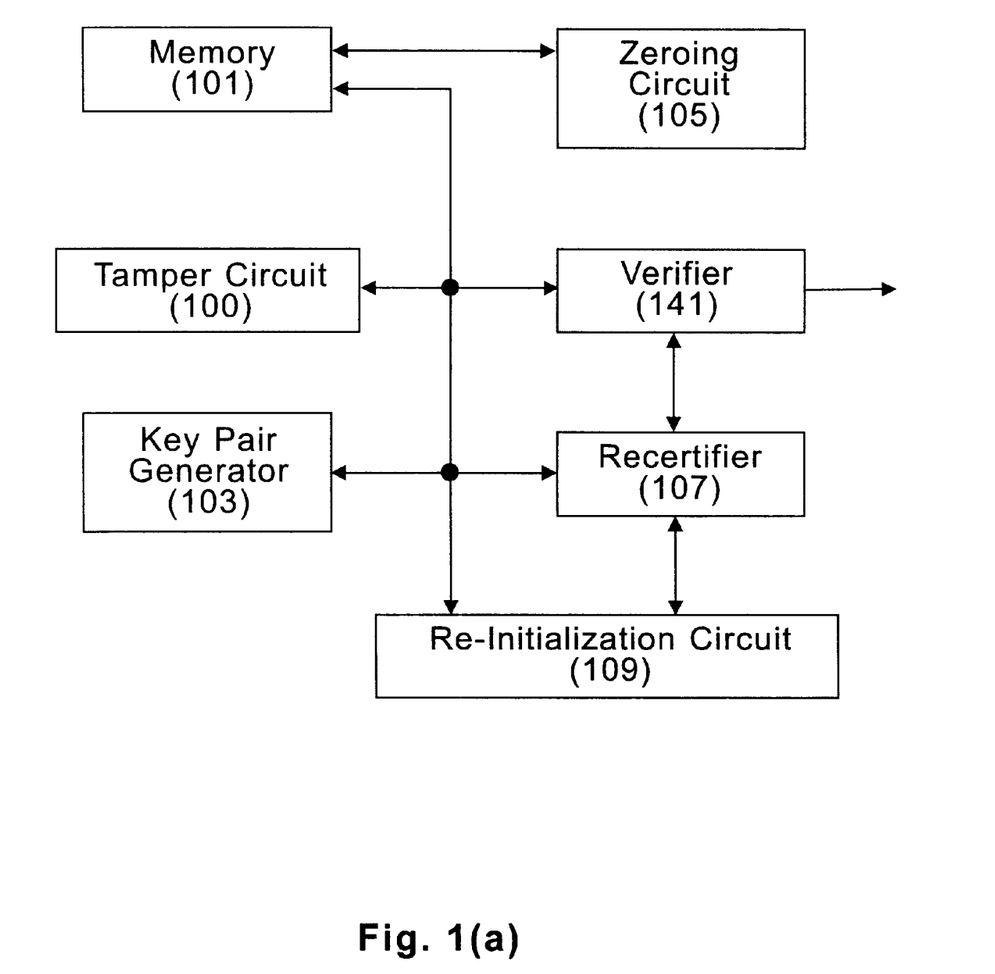
FIG. 1(a) shows an embodiment of an apparatus in accordance with the present invention.

FIG. 1(a) shows an apparatus embodiment of the present invention. The apparatus has an input and an output, and includes a memory 101 for storing code, secrets and operation data. It has a tamper circuit 100 responsive to a tampering phenomenon and coupled to the memory 101. The tamper circuit 100 is capable of being enabled by a certifying authority to respond to the tampering phenomenon. Sometimes, the memory includes all the volatile and non-volatile memory in the apparatus. Generally, there are three kinds of memory. These are volatile DRAM, non-volatile SRAM and non-volatile EEPROM. In a particular embodiment, only the first two are zeroized when a tamper phenomenon is detected.

The certifying authority has an authority private key known to the apparatus. The apparatus also has a key pair generator 103 which generates a device key pair for the apparatus. It is advantageous for the device key pair to be generated using an internal source of non-deterministic randomness and/or to regenerate a new key pair in response to a predetermined event. The predetermined event includes a particular time lapse, a reload of cryptographic software, an amount of apparatus usage and/or a tampering detection. The device key pair includes a device private key and a device public key which are stored in the memory 101. The device key pair generator 103 is capable of exporting the device public key via the output to the certifying authority such that the certifying authority is enabled to perform a verification that the device public key emerged from the apparatus, and that the apparatus was not attacked by the tampering phenomenon. When the verification is successful the certifying authority is able to certify that the apparatus is in an untampered state. Often, the certifying authority is a manufacturer of the apparatus.

In some embodiments the untampered state is certified by the certifying authority signing a first certificate with the authority private key. The first certificate includes the device public key and at least one identifying property of the device. The certifying authority issues the first certificate which becomes available to a third party for use in establishing that the device is in the untampered state.

In some embodiments the device also includes a zeroizing circuit 105 capable of erasing a portion of the memory 101 upon the tamper circuit 100 detecting an occurrence of the tampering phenomenon. It may also include a verifier for outputting a proof of its being in the untampered state by exhibiting a knowledge of the device key pair, and/or a transition certificate producer which produces a transition certificate which certifies the authenticity of the new key pair. The device may have a chain of transition certificates to which each transition certificate is added. It is advantageous for the apparatus to use the device private key to sign the transition certificate which asserts a change from the public key to a new public key, and/or to have chain of transition certificates shown to be rooted in the first certificate so as to maintain the continuity of the untampered state. Sometimes, the device private key is erased.

It is advantageous for the apparatus to have a recertifier 107 for enabling the certifying authority to recertify the apparatus. The recertifier may be used to authenticate the untampered state, provide a recertification of the untampered state, and to attest to the public key. Sometimes, the first certificate purposely has a finite life, and the recertification is performed at predetermined intervals prior to an end of the finite life.

The apparatus may include a reinitialization circuit 109 to perform reinitialization of its circuitry and/or memory 101. All the components of the apparatus may be interconnected with a connecting cable harness 104. These circuits are implemented as known to those skilled in the art and/or described in the below referenced documents.

An array of specific implementing embodiments for various scenarios is described subsequent to the following important considerations. It is noted that this invention exploits the foundation of physical security. This requires that any tamper causes the internal secret portions of memory in the device to be erased. However, in order for the invention to be effective, this foundation must be ensured to be effective. Thus the invention implementation takes several precautions. This includes using special software architecture that ensures that the private key indeed remains private. This is especially required in the face of potentially permeable system software. It also includes regularly inverting the stored secrets, to avoid imprinting the device's SRAM with long-term storage.

Alternate embodiments enable the device to be shipped without its tamper-response enabled, and/or to re-initialize and certify devices that have been erased or zeroized. In these situation, the method and apparatus of the present invention is modified in two ways. Firstly, steps are taken to authenticate that the exported public key really came from the alleged device. One way to do this is to use hidden symmetric keys which do not get erased when the device is zeroized. This is described in the above cross referenced document, attorney docket number YO997-257, entitled, "Authentication for Secure Devices With Limited Cryptology." Secondly, fields in the device's certificate may be used to assert that the device was initialized in a substandard way.

Particular software is often used to restrict access of the device's central private key only to trustworthy code in the device. It is advantageous to use a code downloading approach which allows on-board programs to use the device's provable untampered state as a foundation for authenticating their identity and the fact that they are running in a trusted hardware and software environment. That is to say, the device is untampered and running the particular software the authority expects it to be running, and one has the right to believe that the real device is doing the right thing.

The present invention solves the central problem of providing a computational means for an untampered secure device to prove that it's untampered. However, the present invention also provides additional advantages. This invention, especially if the implementation uses the manufacturer as the certifying authority, minimizes the number of parties that one must trust in order to trust in the alleged untampered state of a device. When a device is physically encapsulated, one is forced to trust the party that did the encapsulation. But with this invention, one need not trust anyone else. This includes personnel at the user site. In the previous example of the electronic wallet, the present invention precludes a user of the wallet from attacking the wallet in order to convince someone else that this user's 'bottomless' wallet is running on an untampered device.

Another advantage of the present invention is the simplicity of shipping and installation of a device. This is because the device carries its own key pair and certificate with which it is always able to prove its authenticity by itself. In particular, the manufacturer does not need to ship extra data out-of-band, nor send trusted engineers to the installation site, nor retain any database of user/device data.

Still another advantage of the present invention is that there are no backdoors through which a device is tamperable without preventing the discovery of any device secrets. This avoids the scenario where tampering of the device causes it to be zeroized, but the device keys being nevertheless discoverable. This is because the device's keys are generated internally to the card by real randomness. Thereby a device user can always ascertain that the device's private key has never been compromised outside of the device.

Still another advantage of the present invention is its providing disaster protection. Nothing inside a zeroized device can enable an attacker to impersonate or attack that device. Furthermore, should the tamper response in a device fail to work, an attacker's determination of that device's data only enables the attacker to impersonate that particular device. No other device is threatened by this determination.

Another advantage of the present invention is that there are no permanent keys. This is because in accordance with the present invention each device generates its own key pair. Also, no device key in the system is forced to be permanent in so much that the key pairs may be regenerated in response to an event. The event is often predefined. For example, it may be defined to occur upon an external command or request, a reload of cryptographic software and/or the passage of a fixed or random time interval. Furthermore, the keypair belonging to the certifying authority does not need to be permanent.

Actual embodiments of the present invention are dependent upon the particular scenario being implemented. A authority could be a third party, distinct from the manufacturer and the end user. If there exists a secure path (equivalent to trusted armed guards) between the manufacturer and this third party, then the third party is essentially an extension of the manufacturer. Otherwise, the third party must first verify the veracity of all the data loaded in the device.

Figure 1B:
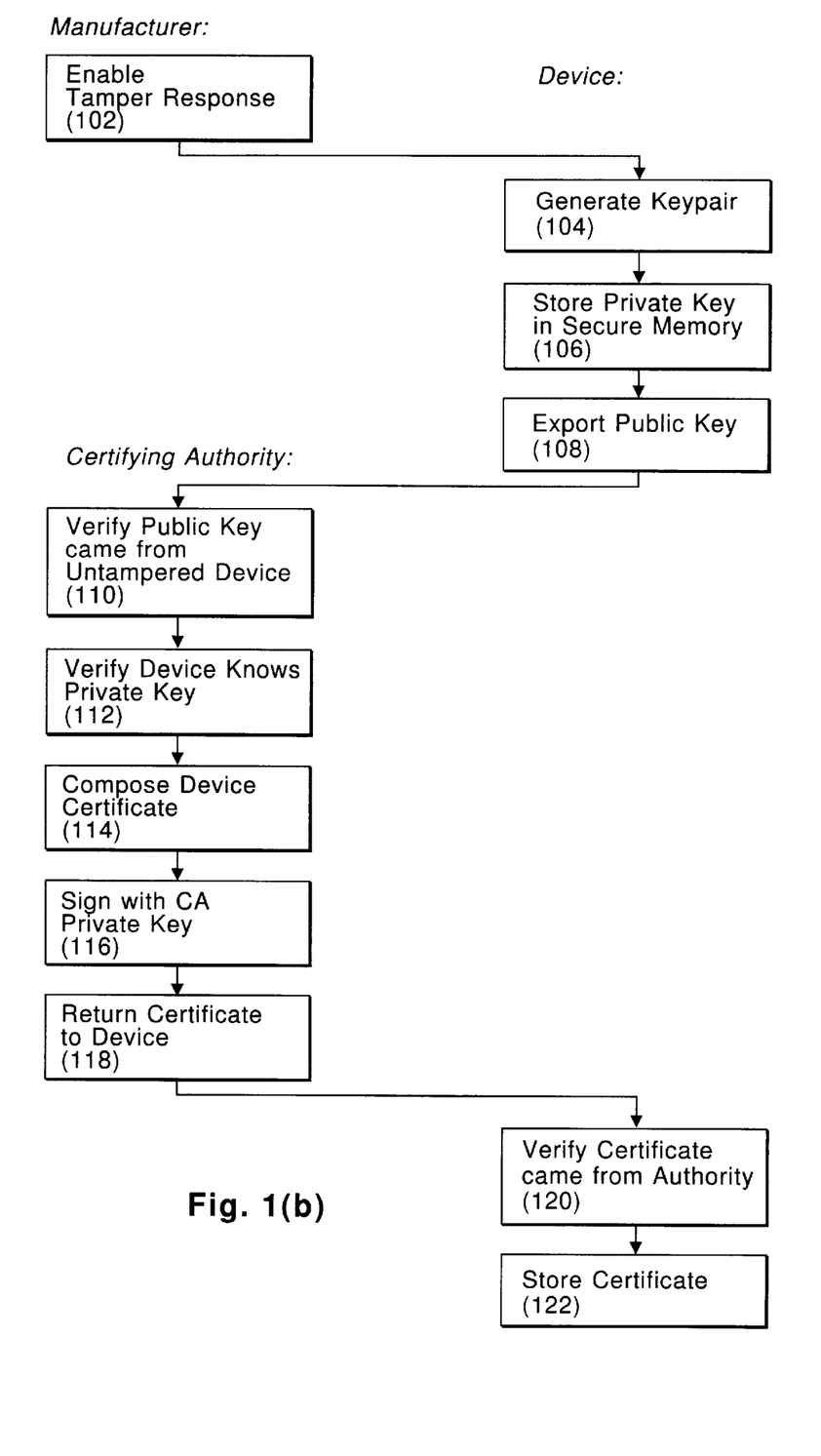
FIG. 1(b) shows a flow diagram of an implementation of initial device certification in accordance with the present invention.

The certifying authority also verifies that the device knows the private key that matches the public key it is claiming (112). This is accomplished by using standard public key cryptography techniques known to those skilled in the art. If these verifications (110, 112) succeed, the certifying authority then composes a device certificate which verifies the validity and security of the device, and its being in an untampered state. The device certificate contains the device's public key, the device's security level, and any other desired identifiers and data (114). The certifying authority signs this certificate with the certifying authority's own private key (116).

The certifying authority then needs to ensure that this certificate can reach any party to whom the device wishes variety of scenarios showing typical utilizations of the present invention are described. The first scenario is an implementation of initial device certification. A flow diagram is shown in FIG. 1(*b*). In the first step to certify the device the certifying authority (usually the manufacturer) enables the tamper-response circuitry in the device (102). In most embodiments, once enabled, this circuitry cannot subsequently be disabled.

The device then uses an internal source of true randomness to generate its initial keypair. The keypair includes a random public key and a random private key (104). It is advantageous that the internal source be a true random number generator. The device stores the private key internally, in secure memory. The secure memory is protected by the tamper-response circuitry (106). The device exports its public key (108) to the certifying authority. At this point, the certifying authority verifies that the public key really originates from an authentic, untampered device (110). It is advantageous that the manufacturer be the certifying authority so that this verification follows directly from the fact that this device was just built and is still inside the manufacturer's vault. However, the certifying to be authenticated. In one implementation the certifying authority does this by sending the certificate to the device (118). The device may thenceforth be requested to present the certificate and/or the information contained in it to the requesting party. In an alternate implementation, the certifying authority publishes the certificate in a public repository.

The device then verifies that the certificate came from the certifying authority (120). In one implementation, this is achieved as a direct consequence of the device still residing inside the protected manufacturing vault. In an alternate implementation, the device has implicitly authenticates the authority as part of a secret key authentication technique. The device then stores the certificate inside its internal non-volatile memory (122). This memory is not necessarily secure. This completes the initial certification of the device.

Figure 2:
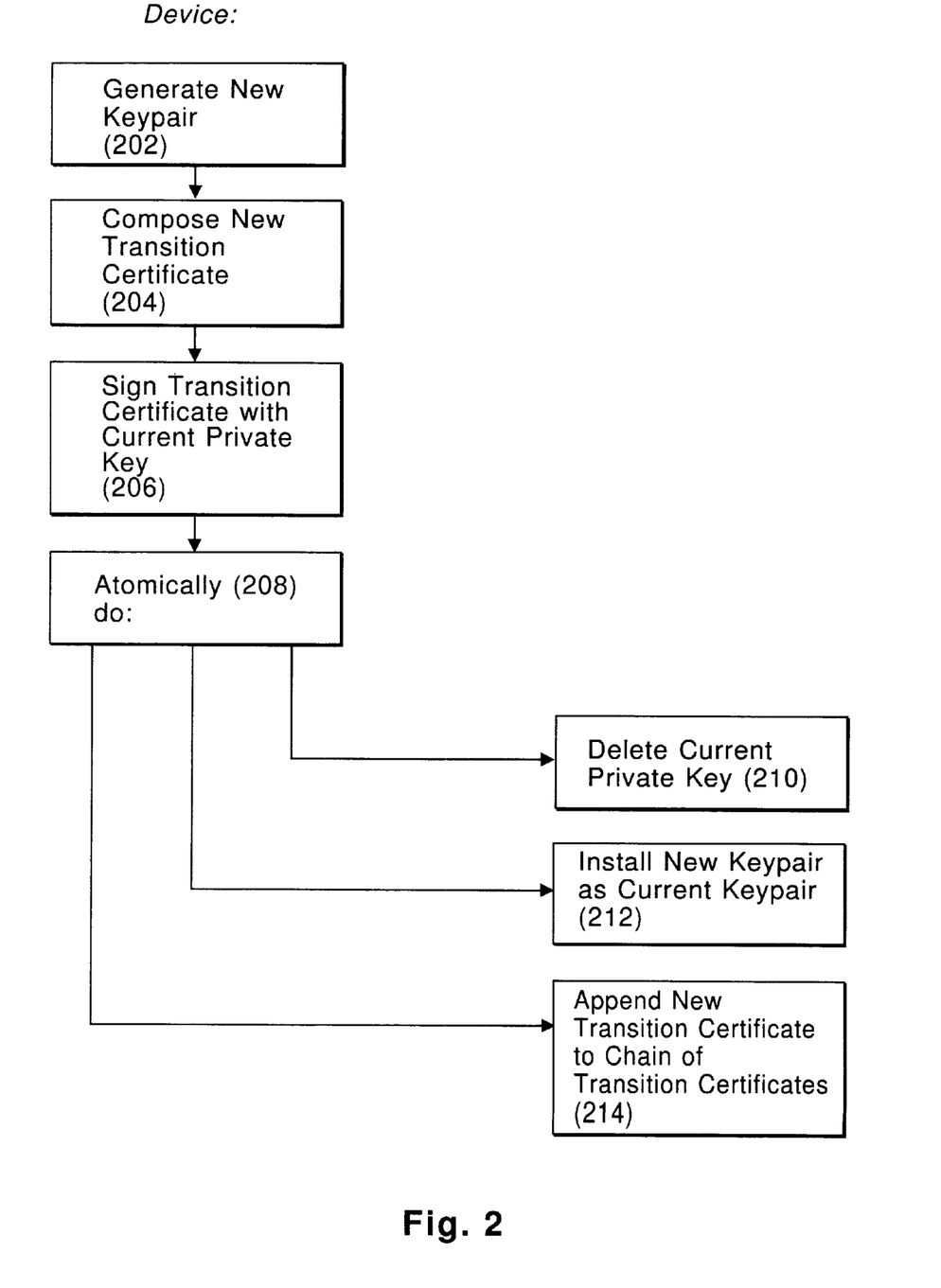
FIG. 2 shows a flow diagram of a scenario to implement a regeneration of the device keypair in accordance with the present invention.

FIG. 2 shows a scenario to implement a regeneration of the device keypair in accordance with the present invention. A device regenerates its keypair based on an explicit request, as an atomic (defined below) part of another operation, and/or based on some periodic or (often purposefully) nondeterministic event. To regenerate its own keypair, the device uses an internal source of true randomness to generate a new keypair (202). The device then composes a 'transition certificate', which includes the new public key of that device, and any other desired additional explanatory information (such as the old public key of that device, why this regeneration occurred) (204). The device then signs the transition certificate with its old private key (206). The device then commits to this new keypair by atomically performing three actions. It deletes the old private key (210). It establishes the new keypair as the current keypair (212). Finally, it appends the transition certificate to the device's list of transition certificates in the devices' nonvolatile memory (214). The list of transition certificates is initially empty. In some embodiments these actions are not performed atomically.

A process is herein referred to as being performed 'atomically', when to any observer, either all of these actions appear to happen, or none of them do, despite failures such as power loss during the operation (208). Thus the three steps 210, 212 and 214 form an atomic operation. With regard to an observer, the three are all performed or none is performed.

Figure 3:
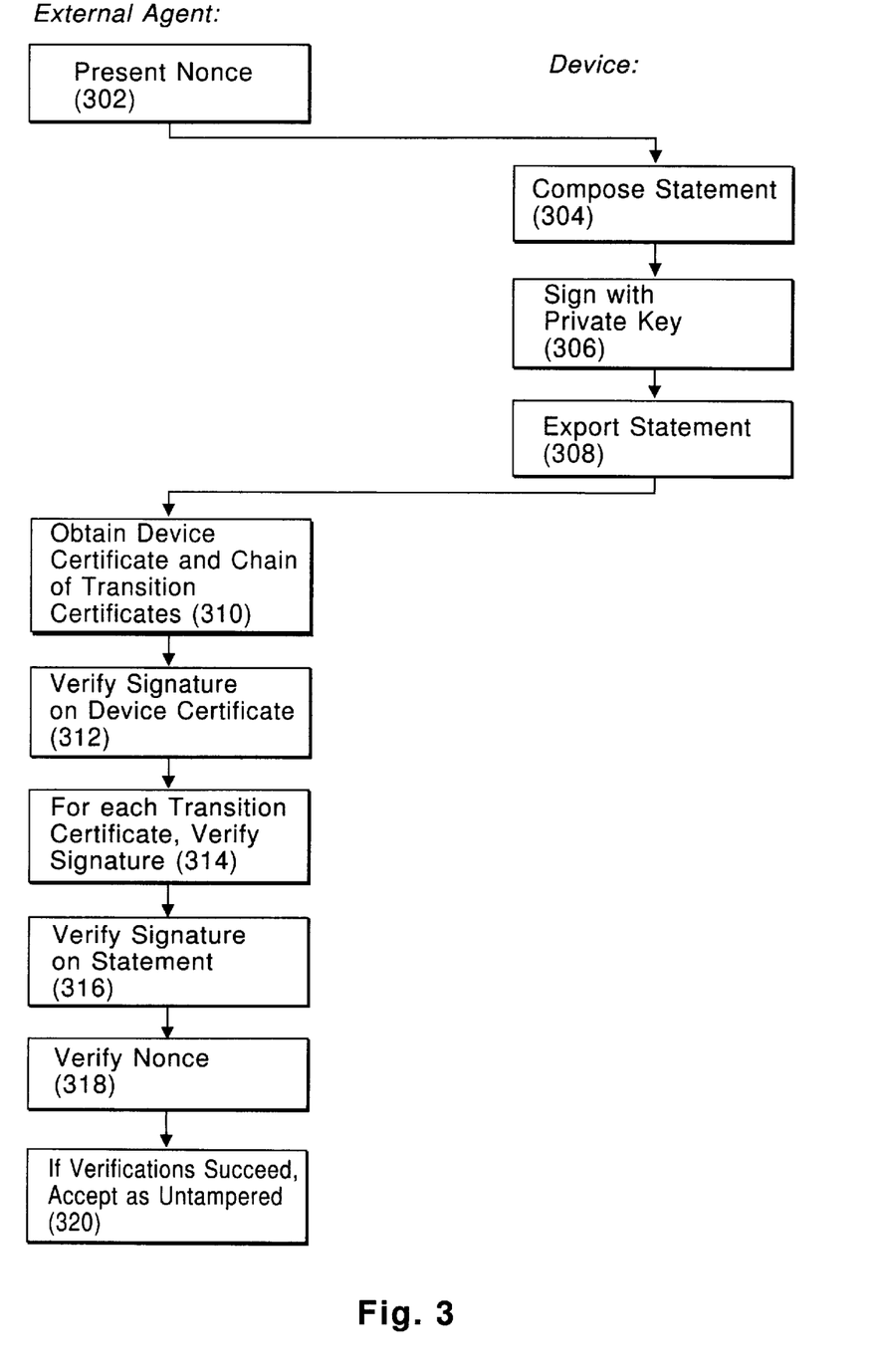
FIG. 3 shows a flow diagram of a scenario for implementing a proof of the untampered state in accordance with the present invention.

A scenario for implementing a proof of untampered state is shown in FIG. 3. FIG. 3 shows that in order for a device to prove its untampered state to an external agent, the agent first presents the device with a nonce (302). A nonce is some data which the agent is confident could not have been predicted by an adversary. The device then composes a statement which includes this nonce (304). It signs this statement with its private key (306), and exports this statement to the agent (308).

The agent now obtains the device's device certificate and transition certificates (310). In one embodiment, the device always has a list of transition certificates, but this list is initially empty. The device stores these certificates and exports them along with the signed statement. An alternate embodiment does this using any transmission route to the agent from the certifying authority. Information goes from the creators of the certificates to the agent. The creator of the transition certificate is the device itself. For example, each certificate could be published in some public repository upon creation. A WEB server is a typical repository.

The agent then needs to verify the signature on the signed statement. This is accomplished by employing a signature verification technique. In one embodiment this technique is performed as follows. Consider that the group of certificates are ordered in a sequence. Let CERT(0) denote the device certificate, and CERT(1) through CERT(N) be the transition certificates. The agent does three things. Firstly, the agent verifies the signature on CERT(0) against the published public key for the certifying authority (312). Secondly, for each 'i>1', the agent verifies the signature on CERT(i) against he public key contained in CERT(i-1) (314). Thirdly, the agent verifies the signature on the signed statement against the public key in the final certificate in this sequence (316). If these verifications are successful and the statement contains the nonce (318), then the agent accepts the device as being untampered (320). This completes the proof of the device's untampered state.

There are some alternates to this approach. In one alternate, the presence of the nonce is used to convince the agent that the device with which it is currently interacting is untampered. In cases in which this property is not critical, the steps using the nonce (302, 318) can be omitted. Stronger authentication techniques (such as zero-knowledge schemes) can also be used in place of the public-key signature approach described above.

Figure 4:
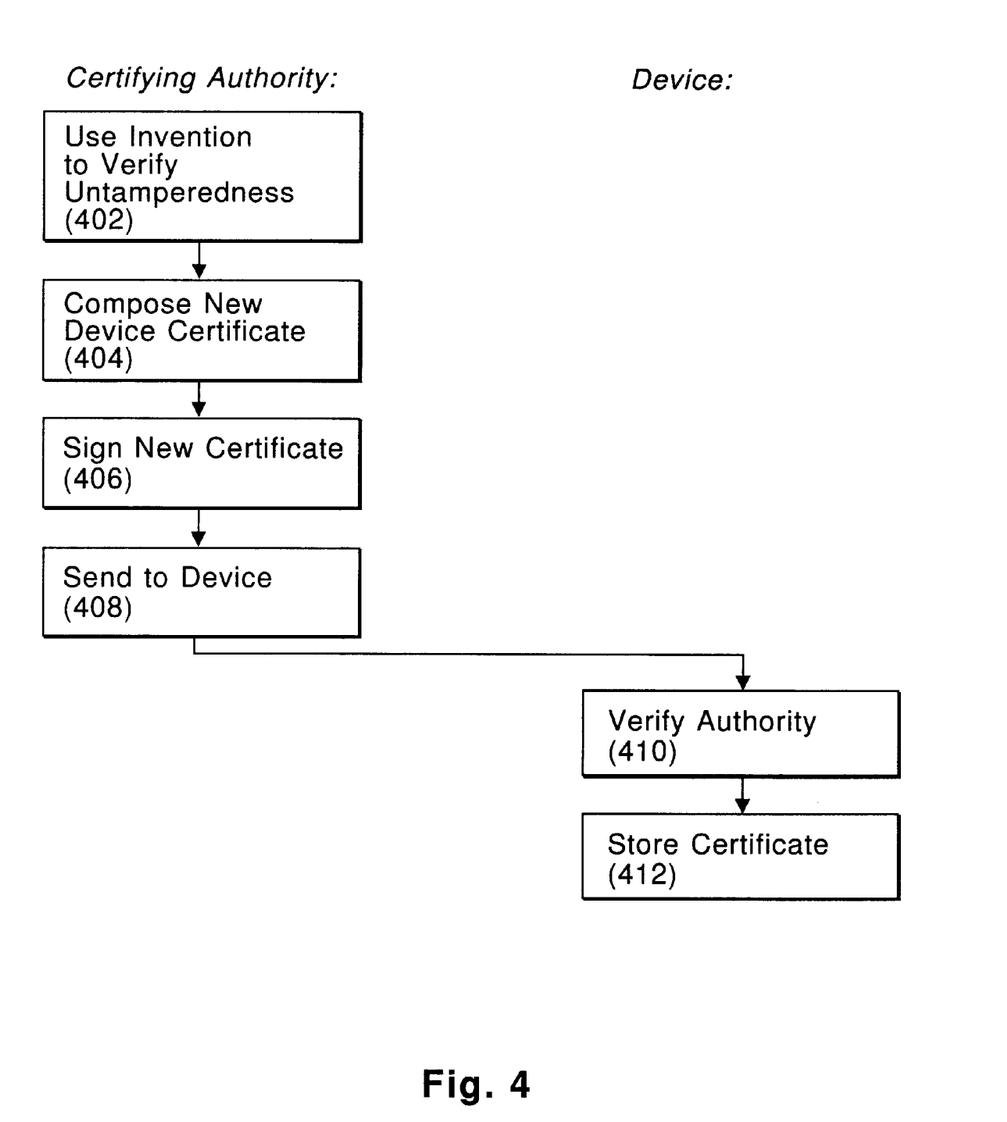
FIG. 4 shows an implementation of a scenario for performing recertification in the Field in accordance with the present invention.

FIG. 4 shows an implementation of a scenario for performing recertification in the field in accordance with the present invention. FIG. 4 shows how a certifying authority can recertify an untampered device as follows. The certifying authority has the device in question prove its untampered state (402). This is accomplished as shown in FIG. 3. In some situations the authority supplements this technique with such things as examination of the device's physical condition and chain of custody. The certifying authority then composes a new device certificate, attesting to the current device public key, device security level, and any other relevant information (404). The certifying authority signs this new device certificate with the authority's current private key (406), and sends this back to the device (408). The device verifies that this new certificate came from an authority permitted to recertify that device (410), and stores this certificate as its new device certificate (412). It is noted that this approach does not require that the certifying authority who recertifies the device to be the same as the certifying authority who initially certified the device.

Alternatives to the approach of FIG. 4 include the following. In one alternative, the device also does additional sanity checking on the new certificate before accepting it. For example, if the device had sufficient computing power and program space, the device could check that the new certificate is of the proper format, is properly signed, and really attests to that device's current public key.

In another alternative, the device could also retain the previous device certificate, or indeed have more than one certificate active at any particular point in time. For example, the device might participate in multiple applications, each of which has its own central certifying authority. In this situation, the device uses a separate certificate chain for each application.

Figure 5:
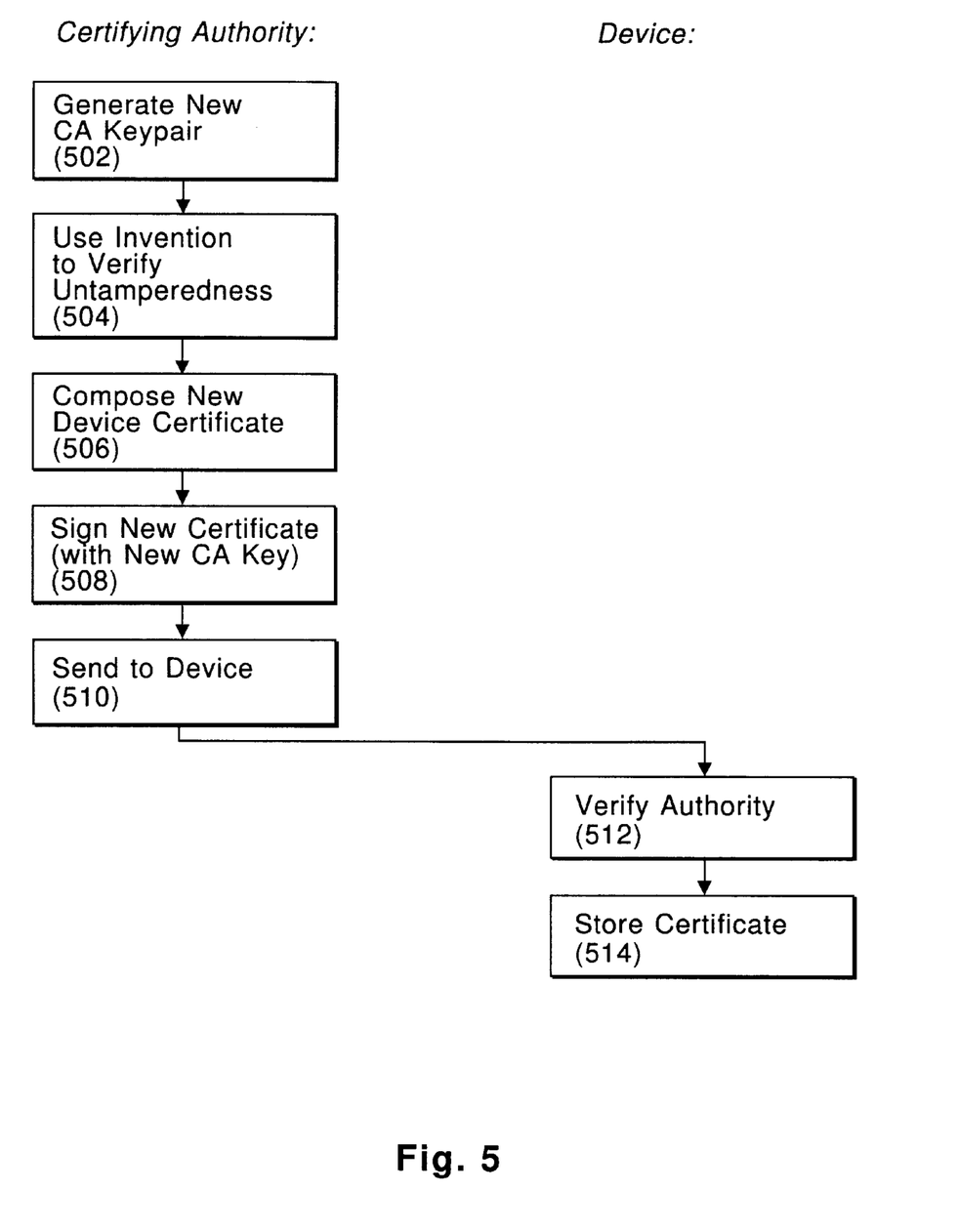
FIG. 5 shows a flow diagram of a scenario for recertifying a device in the field, with regeneration of the certificate authority keypair in accordance with the present invention.

A scenario for recertification in the field, with regeneration of the certificate authority keypair is implemented as shown in FIG. 5. The certifying authority that produced a device's current device certificate can combine recertification of the device with regeneration of the authority's own keypair as follows. As shown in FIG. 5, the authority first regenerates its own keypair (502). Then, the certifying authority has the device in question prove its untampered state (504). This may be accomplished using a process like that shown in FIG. 3. In doing so, the authority makes certain that the device uses signatures based on keypairs that the authority still believes are valid. In some embodiments, this is a matter of policy. The authority may choose to supplement this technique with such things as examination of the device's physical condition and/or chain of custody.

The certifying authority then composes a new device certificate, attesting to the current device public key, device security level, and any other relevant information (506). The certifying authority signs this new device certificate with the authority's new private key (508), and sends this back to the device (510) for storage in its memory. The device verifies that this new certificate came from an authority permitted to recertify that device (512), and stores this certificate as its new device certificate (514).

As discussed in the generic recertification scenario, in some embodiments the device does additional sanity checking on the new certificate before accepting it, and/or the device retains the previous device certificate, and/or the device has more than one certificate active at any particular point in time.

Figure 6:
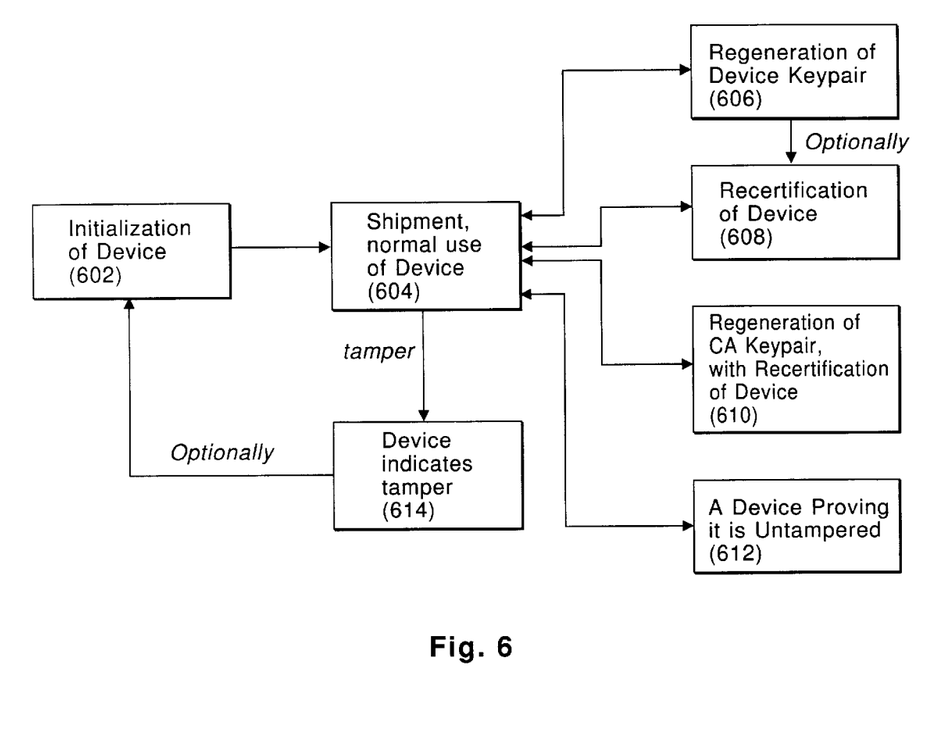
FIG. 6 shows the various scenarios a device might pass through in its lifetime.

FIG. 6 shows how a device might pass through the various scenarios in its lifetime. In 602, the device goes through the steps of 'initialization', 'keypair generation', and 'certification'. The device is then ready for normal use, 604. At this point, a tamper event will cause the device to zeroize its secrets, and enter a 'tampered' state (614), from which it could be returned to 602, should policy and implementation decisions allow that.) However, during normal, untampered use (604), the device can then undergo 'regeneration' (606), 'recertification' (608). Often regeneration may be followed be certification. The CA can also regenerate its own keypair and then recertify the device (610). The Device can also prove that is in an untampered state (612). It is noted that for the most part item 602 matches FIG. 1(*b*), item 606 matches FIG. 2, item 612 matches FIG. 3, item 608 matches FIG. 4, and item 610 matches FIG. 5).

A challenge remains in finding a way to verify the untampered state of a device that is not yet ready for this invention. A number of situations have been identified where it is necessary to verify the untampered state of a device, but where this invention cannot be used. To address this, a technique called "Secret Key Authentication" (SKA) has been invented. This is described in above cross-referenced application, attorney docket number YO997-257, entitled, "Authentication for Secure Devices With Limited Cryptography", by inventors M. S. Matyas et al. It is noted that it is most advantageous to use this invention in combination with the Hardware Locks memory protection technique described in the same cross referenced application. Hardware Locks provides a software architecture which ensures that the private key indeed remains private. This is especially important in the face of potentially permeable system software. Hardware Locks also ensures that the stored secrets are regularly converted and/or inverted so as to avoid imprinting the Memory (SRAM) on the device with long-term storage.

The following documents are incorporated herein by reference: U.S. Pat. No. 4,860,351, entitled, "Tamper-Resistant Packaging for Protection of Information Stored in Electronic Circuitry", by S. H. Weingart, issued Aug. 22, 1989; U.S. Pat. No. 5,159,629, entitled, "Data Protection by Detection of Intrusion into Electronic Assemblies", by G. P. Double and S. H. Weingart, issued Oct. 27, 1992; Federal Information Processing Standards Publication 140-1, "Security Requirements for Cryptographic Modules" US Department of Commerce/National Institute of Standards and Technology, Jan. 11, 1994; "Applied Cryptography", by B. Schneier, 2nd edition, Wiley and Sons, New York, 1996, ISBN # 0-471-12845-7. These are incorporated herein for many purposes, including the enablement of tamper resistance, key generation and other circuits in the present invention.

An application filed concurrently with this application, attorney docket number YO997-157, entitled, "Securely Downloading and Executing Code From Mutually Suspicious Authorities", by inventors S. W. Smith et al., provides a system, method and apparatus for secure code downloading. It restricts access of the device's central private key only to trustworthy code in the device. The code downloading approach disclosed allows on-board programs to use the device's provable untampered state as a foundation for authenticating themselves as running in a trusted environment.

It is noted that this invention may be used for many technologies and applications. These include any secure processor technology in such areas as banking, secure business transactions, secure databases etc. applications include electronic commerce, information privacy and integrity, etc. It is required in future type smart cards provided with enough resources to support the invention. Thus, although the description is made for particular arrangements and applications, the intent and concept of the invention is suitable. It will be clear to those skilled in the art that other modifications to the disclosed embodiments can be effected without departing from the spirit and scope of the invention.

What is claimed is:

1. A device having an input and an output, said device comprising:

a memory;

a tamper circuit coupled to said memory and being responsive to a tampering phenomenon, such that a certifying authority can determine an occurrence of said phenomenon, said certifying authority having an authority public key known to said device;

a key pair generator which generates a device key pair for said device, said device key pair includes a device private key and a device public key which are stored in said memory, said device key pair generator is capable of exporting said device public key via said output to said certifying authority such that said certifying authority is enabled to perform a verification that said device public key emerged from said device, and that said device was not attacked by said tampering phenomenon, and whereupon said verification being successful said certifying authority is able to certify that said device is in an untampered state, wherein said device key pair generator regenerates a new key pair in response to a predetermined event; and a transition certificate which certifies an authenticity of said new key pair.

2. A device as recited in claim 1, wherein said untampered state is certified by said certifying authority by:

signing a first certificate with said authority private key, said first certificate includes said device public key and at least one identifying property of said device; and issuing said first certificate which becomes available to a third party for use in establishing that said device is in said untampered state.

3. A device as recited in claim 1, wherein said certifying authority is a manufacturer of said device.

4. A device as recited in claim 1, wherein said device key pair is generated using an internal source of non-deterministic randomness.

5. A device as recited in claim 1, further comprising a verifier for outputting a proof of its being in said untampered state, by exhibiting a knowledge of said device key pair.

6. A device as recited in claim 1, wherein said device key pair generator regenerates a new key pair in response to a predetermined event.

7. A device as recited in claim 1, wherein said device has a chain of transition certificates, and said transition certificate is added to said chain of transition certificates.

8. A device as recited in claim 6, wherein said predetermined event is a reload of cryptographic software.

9. A device as recited in claim 1, further comprising a zeroizing circuit capable of erasing a portion of said memory upon said tamper circuit detecting an occurrence of said tampering phenomenon.

10. A device as recited in claim 9, wherein said memory includes all non-volatile memory in said device.

11. A device as recited in claim 1, further comprising a recertifier for enabling said certifying authority to authenticate said untampered state, provide a recertification of said untampered state, and attest to said public key.

12. A device as recited in claim 11, wherein said first certificate has a finite life, and said recertification is performed at predetermined intervals prior to an end of said finite life.

13. A device as recited in claim 1, wherein said device uses said device private key to sign said transition certificate which asserts a change from said public key to a new public key.

14. A device as recited in claim 13, wherein said device private key is erased.

15. An apparatus as recited in claim 13, wherein said transition certificates are shown to be rooted in said first certificate so as to maintain said untampered state.

16. A device as recited in claim 15, further comprising a recertifier for enabling said certifying authority to recertify said device.

17. A device as recited in claim 16, wherein said recertifier authenticates said untampered state, provides a recertification of said untampered state, and attests to said public key.

18. A device as recited in claim 1, wherein said tampering phenomenon is such as to cause the device to undergo an action that triggers tamper-response zeroization.

19. A device having a memory which includes data required to be erased upon a tampering attempt, said device comprising:
  a tamper responsive circuit having an enabling capability;
  a certifying authority;
  an initialization circuit wherein said certifying authority enables said tamper responsive circuit using said enabling capability;
  a first key pair generator for generating a public key made available to a plurality of third party users, and for generating a private key retained in said memory;
  a certification circuit for exporting said public key to said certifying authority such as to enable said certifying authority to verify said public key, to certify that said public key emerged from said device, and to certify that said device is untampered; and
  a key pair regenerator for forming a new key pair, upon an occurrence of a predetermined event, where said key pair includes a new public key and a new private key.

20. A device as in claim 19, further comprises a recertifier for exporting said new public key to said certifying authority such as to enable said certifying authority to verify said new public key and certify that said new public key emerged from said device and that said device is untampered.

21. A device as in claim 19, wherein at least a portion of said memory is zeroized upon said tamper responsive circuit detecting a tampering event.

22. A device as in claim 21, wherein said device further comprises a memory disaster protection circuit for stopping an attacker from impersonating said device.

23. A device as in claim 21, further comprising a re-initialization circuit for reinitializing said device to an operative state following said device being zeroized in response to said tampering event.

24. A device as in claim 21, wherein said reinitialization circuit employs hidden symmetric keys.

25. A device as in claim 23, wherein said certification circuit marks a particular data field in a certificate verifying said device, to indicate that said device was initialized in a substandard manner.

26. A method for a certifying authority to certify an untampered state of a device, said method comprising:
  providing a tamper circuit being responsive to a tampering phenomenon;
  a certifying authority determining an occurrence of said phenomenon, said certifying authority having an authority public key known to said device;
  generating a device key pair for said device, said device key pair including a device private key and a device public key which are stored in said memory;
  exporting said device public key to said certifying authority;
  enabling said certifying authority to perform a verification that said device public key emerged from said device, and that said device was not attacked by said tampering phenomenon, and whereupon said verification being successful said certifying authority certifying that said device is in an untampered state;
  regenerating a new key pair in response to a predetermined event; and
  generating a transition certificate certifying authenticity of said new key pair.

27. A method as in claim 26, wherein said certifying authority is a manufacture of the device.

28. A method as in claim 26, wherein said step of generating is performed internal to said device.

29. A method as in claim 28, wherein said step of generating is performed by a random key pair generator.

30. A method as in claim 26, further comprising ensuring that said device certificate is available to a user to whom the device wishes to be authenticated.

31. A method as in claim 30, wherein said step of ensuring is implemented by the certifying authority sending said certificate to the device.

32. A method as in claim 31, further comprising said device authenticating that said certificate came from said certifying authority.

33. A method as in claim 32, wherein said step of authenticating is implemented using a secret key authenticating technique.

34. A device having a memory which includes data required to be erased upon a tampering attempt, said device comprising:

a tamper responsive circuit having an enabling capability;

a certifying authority;

an initialization circuit wherein said certifying authority enables said tamper responsive circuit using said enabling capability;

a first key pair generator for generating a public key made available to a plurality of third party users, and for generating a private key retained in said memory; and a certification circuit for exporting said public key to said certifying authority such as to enable said certifying authority to verify said public key, to certify that said public key emerged from said device, and to certify that said device is untampered, wherein at least a portion of said memory is zeroized upon said tamper responsive circuit detecting a tampering event;

a re-initialization circuit for reinitializing said device to an operative state following said device being zeroized in response to said tampering event, wherein said certification circuit marks a particular data field in a certificate verifying said device, to indicate that said device was initialized in a substandard manner.

* * * * *